United States Patent
Sipe et al.

(10) Patent No.: US 10,706,639 B2
(45) Date of Patent: Jul. 7, 2020

(54) MOBILE SCANNING SYSTEM FOR PROCESSING NON-MACHINABLE, UNDELIVERABLE-AS-ADDRESSED MAIL

(71) Applicant: Siemens Industry, Inc., Alpharetta, GA (US)

(72) Inventors: Stanley W. Sipe, North Richland Hills, TX (US); Abdul Hamid Salemizadeh, Burleson, TX (US); Hongjian Li, Coppell, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 143 days.

(21) Appl. No.: 15/984,447

(22) Filed: May 21, 2018

(65) Prior Publication Data

US 2018/0336740 A1    Nov. 22, 2018

Related U.S. Application Data

(60) Provisional application No. 62/509,366, filed on May 22, 2017.

(51) Int. Cl.
| | |
|---|---|
| *G07B 17/00* | (2006.01) |
| *G06K 9/00* | (2006.01) |
| *H04L 29/08* | (2006.01) |
| *B07C 7/00* | (2006.01) |
| *B07C 3/14* | (2006.01) |

(52) U.S. Cl.
CPC ........ *G07B 17/00661* (2013.01); *B07C 7/005* (2013.01); *G06K 9/00463* (2013.01); *G06K 9/00469* (2013.01); *G07B 17/00435* (2013.01); *H04L 67/10* (2013.01); *B07C 3/14* (2013.01); *G06K 2209/01* (2013.01); *G07B 17/00508* (2013.01); *G07B 2017/0062* (2013.01); *G07B 2017/00451* (2013.01); *G07B 2017/00717* (2013.01); *G07B 2017/00725* (2013.01)

(58) Field of Classification Search
CPC ....... B07C 3/10; B07C 1/00; G07B 17/00661; G06K 9/00469
See application file for complete search history.

(56) References Cited

U.S. PATENT DOCUMENTS

| | | | |
|---|---|---|---|
| 7,145,093 B2 | 12/2006 | Mampe et al. | |
| 2002/0070149 A1* | 6/2002 | Schererz | B07C 1/02 209/540 |
| 2004/0005080 A1* | 1/2004 | Hayduchok | B07C 3/14 382/101 |
| 2004/0093222 A1 | 5/2004 | Sipe et al. | |
| 2010/0100233 A1* | 4/2010 | Lu | B07C 3/18 700/226 |
| 2010/0102116 A1 | 4/2010 | Rochelle et al. | |

(Continued)

*Primary Examiner* — John J Lee

(57) ABSTRACT

A mail piece processing apparatus and related method. A mail piece processing apparatus includes a base, a table connected to the base by a vertical member, a camera mounted above the table and positioned to take an image of a mail piece on the table, and a data processing system. The data processing system is configured to receive the image of the mail piece from the camera; determine address information and address information of the mail piece according to the image; determine a disposition result for the mail piece according to the image; and cause a label to be printed for the mail piece according to the disposition result.

18 Claims, 6 Drawing Sheets

(56) References Cited

U.S. PATENT DOCUMENTS

| | | | |
|---|---|---|---|
| 2012/0243728 A1* | 9/2012 | Carpenter | G06K 9/00449 382/101 |
| 2013/0044350 A1 | 2/2013 | Mungo | |
| 2013/0299396 A1 | 11/2013 | Li et al. | |
| 2017/0270358 A1 | 9/2017 | Salemizadeh et al. | |

* cited by examiner

MOBILE SCANNING SYSTEM FOR PROCESSING NON-MACHINABLE, UNDELIVERABLE-AS-ADDRESSED MAIL

CROSS-REFERENCE TO RELATED APPLICATION

This application claims the benefit of the filing date of U.S. Provisional Patent Application U.S. 62/509,366, filed May 22, 2017, which is hereby incorporated by reference.

TECHNICAL FIELD

Aspects of the present invention generally relate to processing undeliverable-as-addressed (UAA) mail.

BACKGROUND OF THE DISCLOSURE

Current systems are unable to efficiently or effectively detect and process UAA mail, including letters, flats, and packages, particularly "non-machinable" or "non-automation" mail that is not suitable for processing on automated mail processing equipment. Improved systems are desirable.

SUMMARY OF THE DISCLOSURE

Disclosed embodiments relate to systems and method mobile scanning system for processing non-machinable, undeliverable-as-addressed mail, and other devices, systems, and methods as disclosed herein.

A disclosed embodiment includes a mail piece processing apparatus and related method. A mail piece processing apparatus includes a base, a table connected to the base by a vertical member, a camera mounted above the table and positioned to take an image of a mail piece on the table, and a data processing system. The data processing system is configured to receive the image of the mail piece from the camera; determine address information and address information of the mail piece according to the image; determine a disposition result for the mail piece according to the image; and cause a label to be printed for the mail piece according to the disposition result.

A method performed by a mail piece processing apparatus as described herein includes receiving the image of the mail piece from the camera. The method includes determining address information and address information of the mail piece according to the image. The method includes determining a disposition result for the mail piece according to the image. The method includes causing a label to be printed for the mail piece according to the disposition result.

A number of other features are includes in the detailed description below. For example, in various embodiments, the apparatus also includes wheels upon which the base is mounted. In various embodiments, a height of the table above the base is adjustable. In various embodiments, the table includes at least one mail piece stop along a side of the table. In various embodiments, the mail piece is a non-automation, undeliverable-as-addressed mail piece. In various embodiments, the table includes a digital scale connected to communicate with the data processing system. In various embodiments, the data processing system is further configured to send the image to an image management system server. In various embodiments, the data processing system is further configured to send the image to a server that performs an optical character recognition process on the image, and to receive the disposition result from the server. In various embodiments, the data processing system is further configured to send the addressee information and address information to a server, and to receive the disposition result from the server. In various embodiments, the data processing system is further configured to determine physical characteristics of the mail piece, and the disposition result includes a shipping charge for the mail piece. In various embodiments, the table includes a plurality of trigger marks on a top surface of the table visible to the camera, and the data processing system is further configured to detect the presence of the mail piece according to the trigger marks and in response, to cause the camera to automatically take the image of the mail piece. In various embodiments, the mail piece is a topmost mail piece in a stack of mail pieces on the table. In other cases, single mail pieces can be passed over the table to be automatically detected, imaged, and processed as described herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
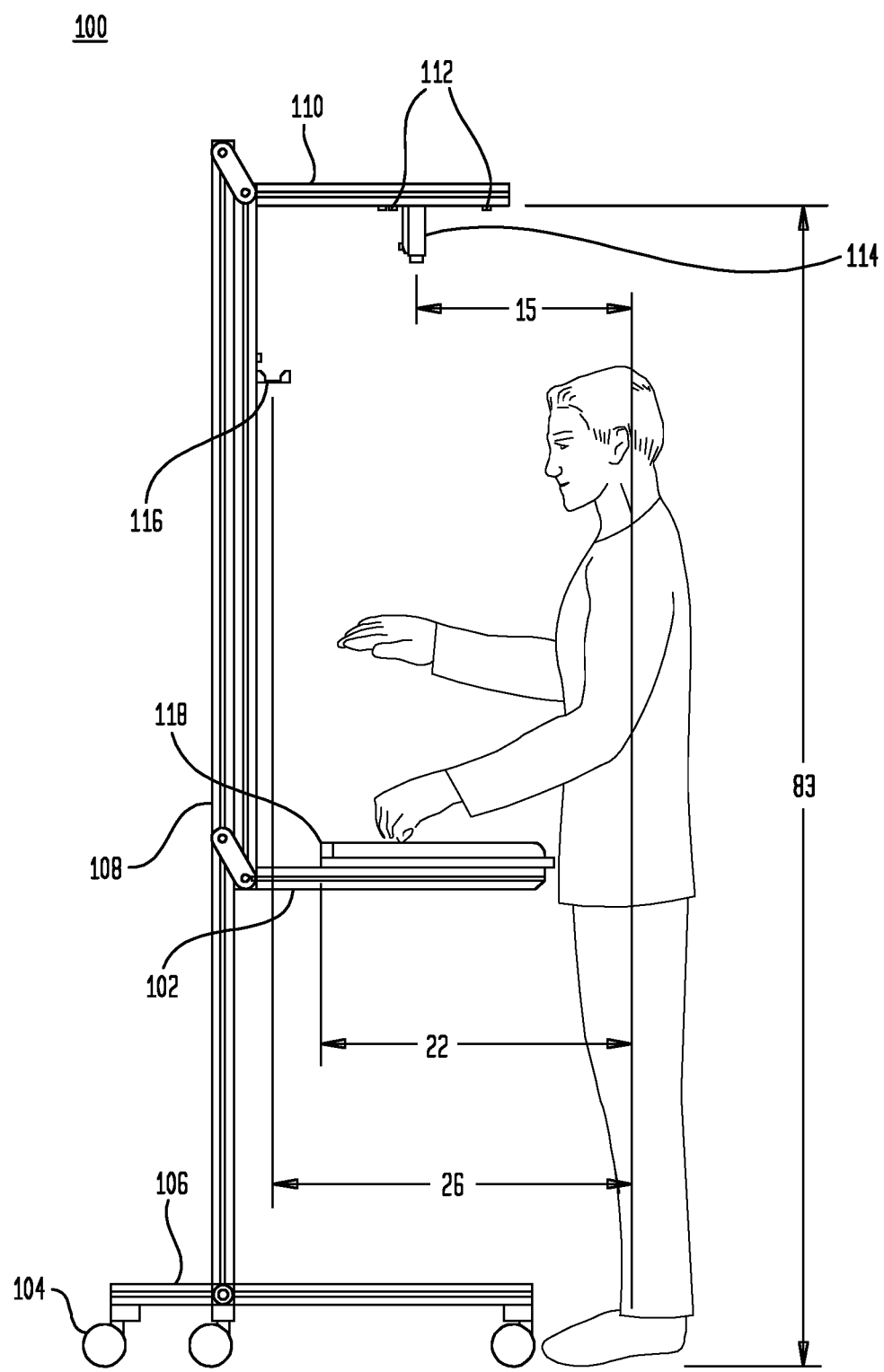
FIG. 1 illustrates an example of an apparatus and system in accordance with disclosed embodiments.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The detection and processing of non-machinable UAA mail is currently a costly and time consuming manual process for postal organizations. Due to the unsuitability of non-machinable mail pieces, they require highly skilled (and costly) postal workers with specialized knowledge of the mail sorting and delivery schemes ("Scheme Knowledgeable" workers) to sort the non-machinable mail to the correct mail carrier and carrier route sequence.

Further cost is incurred once the carrier identifies the non-machinable mail as UAA. All UAA non-machinable mail is then batch-shipped back to a facility where it is processed manually to determine the correct new address, to be relabeled and shipped to the new (correct) address manually. The entire process is manual, time consuming, error prone, and costly.

Disclosed embodiment include a specialized, universal non-machinable sortation and UAA detection apparatus capable of digitizing the recipient address of the mail piece regardless of the shape (letter, flat, package), verifying the address against a national database of all valid move-address records, and determining the correct address for the recipient based on the recipient's first and last name.

Furthermore, systems as disclosed can sort the non-machinable mail piece to the correct carrier and route automatically without the requirement for a skilled Scheme Knowledgeable employee. The system can use imaging software and hardware for digitization, an optical character recognition system (OCR), and specialized interfaces for real-time lookup of National Move Record databases.

A universal non-machinable sortation and UAA processing system as disclosed herein can digitize the recipient's address using specialized onboard imaging equipment, utilize the specialized postal OCR to interpret the address and the recipient's first/last name. The system can verify and correct the address (if necessary) by interfacing and utilizing any available national delivery address databases.

A disclosed system can utilize the recipient's first and last name along with the verified address and perform a lookup in the national move record database to determine if the mail piece address is the current and validated address for the named recipient. If the digitized mail piece address is current and correct, the system indicates the correct sort destination for the non-machinable mail piece automatically based on the available sort-plan. If the National Move Record database indicates a new verified address for the recipient, the universal sorter automatically designates the mail piece as UAA and sorts it accordingly.

Various embodiments can detect non-machinable UAA mail before being delivered the destination carrier. This reduces time and cost. Various embodiments can enable lower skilled employees to perform this function. This reduces labor cost and training.

Various embodiments can increases productivity for the processing of UAA mail items. Various embodiments are capable of processing all shapes, including letters, flats and parcels.

In various embodiments, the scanning operation is ergonomic. The scanning and placement of the items is done in a fluid motion from start to finish, including overlapping from one mail item to the next. This increases productivity and is less error prone. In some cases, particularly when working from a stack of mail pieces on the table, soon as one mail piece has been imaged and is being moved or further processed by the operator, the next mail piece on the stack is automatically detected and imaged, allowing the operator to go as fast as they can while scanning.

In various embodiments, the system is mobile allowing it to be used in more than one location and operation.

Various embodiments can support flexible destination sortation to cases, bins, trays or tubs based upon the postal operation requirements. Various embodiments can easily be integrated into postal operations both physically and through IT networks.

Various embodiments can provide a stand for customer computer equipment and power. Various embodiments can provide a self-contained scanning system with camera and lighting. Various embodiments can provides for adjustable lighting for different environments (natural light, florescent, etc.). Various embodiments can include a platform for stacks of items to be scanned by an overhead camera.

Various embodiments can include a positive stop on the platform to position the stack. Various embodiments can minimize material handling; operate without special material preparation requirements. Various embodiments can allow relocation of the stop to accommodate left or right handed operation. Various embodiments can allow height adjustment of the platform to accommodate operator stature. Various embodiments are mobile.

Various embodiments can provide optical character recognition to scan the destination address block automatically and detect potential UAA items. If not a UAA item, then provide the sorting instructions to the original destination. Various embodiments can connect to local IT networks or in the cloud for back-end data processing. Various embodiments can provide automated statistics which today there is no or little visibility into the manual operation. Therefore, allowing for further process optimization.

Various embodiments can be connected to labeling and/or printing device to mark the mail item as UAA or redirect the mail item at the delivery unit.

Various embodiments can scan and process Change of Address Forms at the Delivery unit. Various embodiments can detect waste mail.

FIG. 1 illustrates an example of a mail piece processing apparatus 100 and system in accordance with disclosed embodiments, including various features and components as described herein, and including exemplary but non-limiting dimensions. "Mail piece," as used herein, is intended to refer to letters, flats, parcels, packages, and any other item being mailed and processed as described herein unless otherwise specified.

Mail piece processing apparatus 100 can be implemented as a movable cart stand. In the example illustrated in FIG. 1, apparatus 100 includes a height-adjustable table 102. The table 102 can include adjustable mail piece stops 118 on one or more sides, implemented as raised edges so that a mail piece being processed can be quickly placed into a uniform position on the table 102. Apparatus 100 can be mounted on wheels 104 to enable the apparatus to be moved to an appropriate processing station/location, for example at a delivery unit. Wheels 104 support a base 106, from which a vertical member 108 extends. Table 102 is mounted on vertical member 108, and its height above the base or ground can be adjusted along vertical member 108. In some embodiments, table 102 can include an integral electronic scale configured to weigh mail pieces placed on the table and transmit the weight to a data processing system as described below.

Arm 110 extends from vertical member 108, over table 102. Arm 110 supports auxiliary devices such as lights 112 and camera 114. Vertical member 108 can also support a camera power supply mount 116 for powering camera 114. Table 102 and camera 114 are positioned so that a mail piece (or the topmost of a stack of mail pieces) on table 102 are within the field of view of camera 114.

Note that while this example specifically describes a rolling apparatus, in other cases the base 106 can be, for example, a conventional desk or other surface which implements the "table" 102 or on which the table 102 is placed. The camera 114 is mounted above the surface of the table 102. In still other cases, the camera could be hand-held instead of mounted, and used as a handheld scanner in processes as described herein.

In some non-limiting embodiments, camera 114 can be, for example, a universal serial bus (USB) camera with a resolution of 5 megapixels, mounted with its lens 940 mm from the mail piece on table 102, providing an image resolution of 175-200 dots per inch with a field of view of 320 mm×250 mm.

In other non-limiting embodiments, camera 114 can have, for example, a 2590×2048 pixels resolution, use a Python 5000 sensor with a 1 inch sensor size, a global shutter operating at 60 fps, operate in mono (grayscale) color, use a USB 3.0 interface, have a programmable exposure, and have a 29.3 mm×29 mm×29 mm housing.

Figure 2:
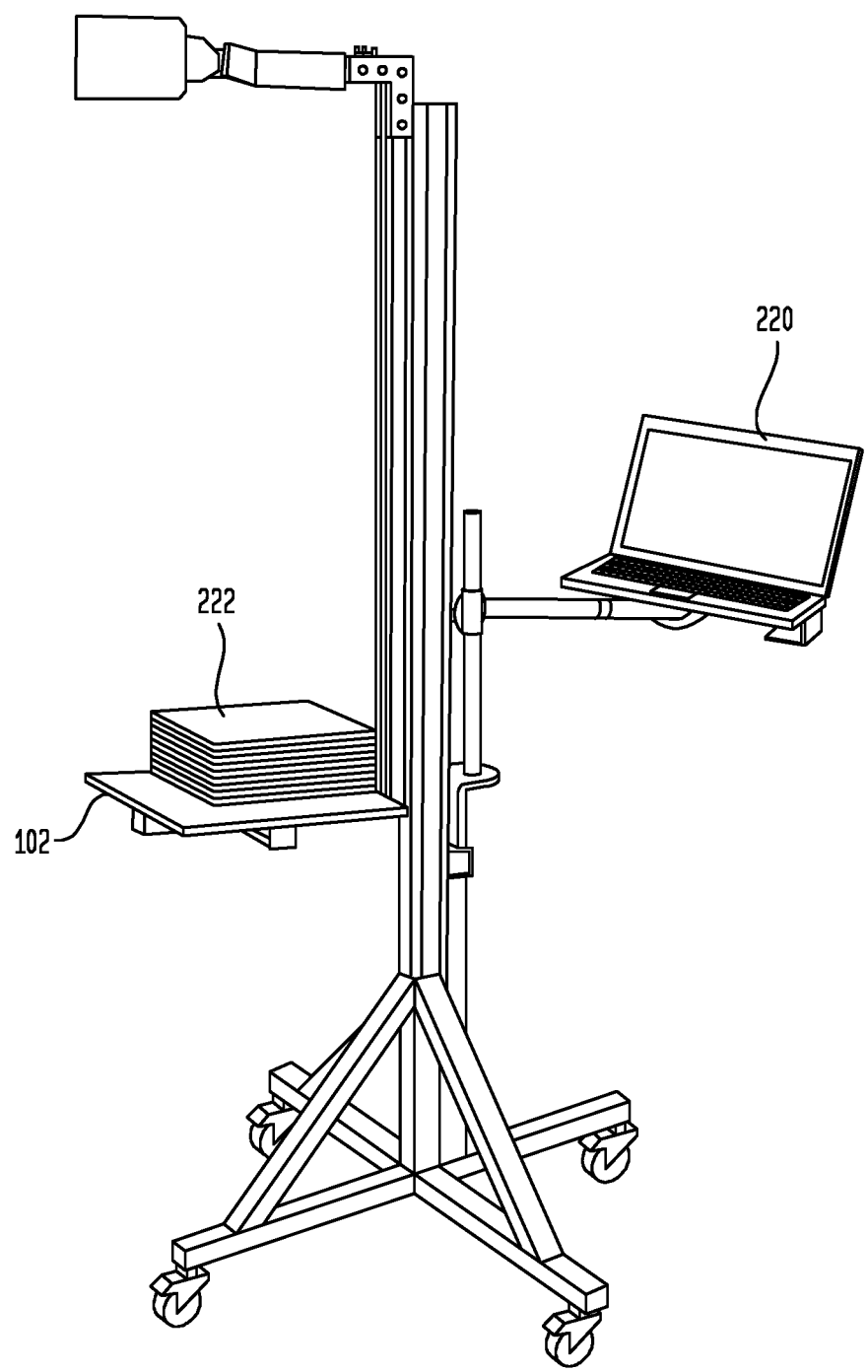
FIG. 2 illustrates a second example of an apparatus in accordance with disclosed embodiments.

FIG. 2 illustrates a second example of an apparatus 100 in accordance with disclosed embodiments, from a different perspective. This perspective shows a data processing system 220, such as a laptop or portable computer, mounted so that the operator of apparatus 110 can clearly see its screen. The data processing system 220 can be mounted directly or indirectly to be supported by vertical member 108. This figure also illustrates a stack of sample mail pieces 222 on table 102 of apparatus 100.

Figure 3:
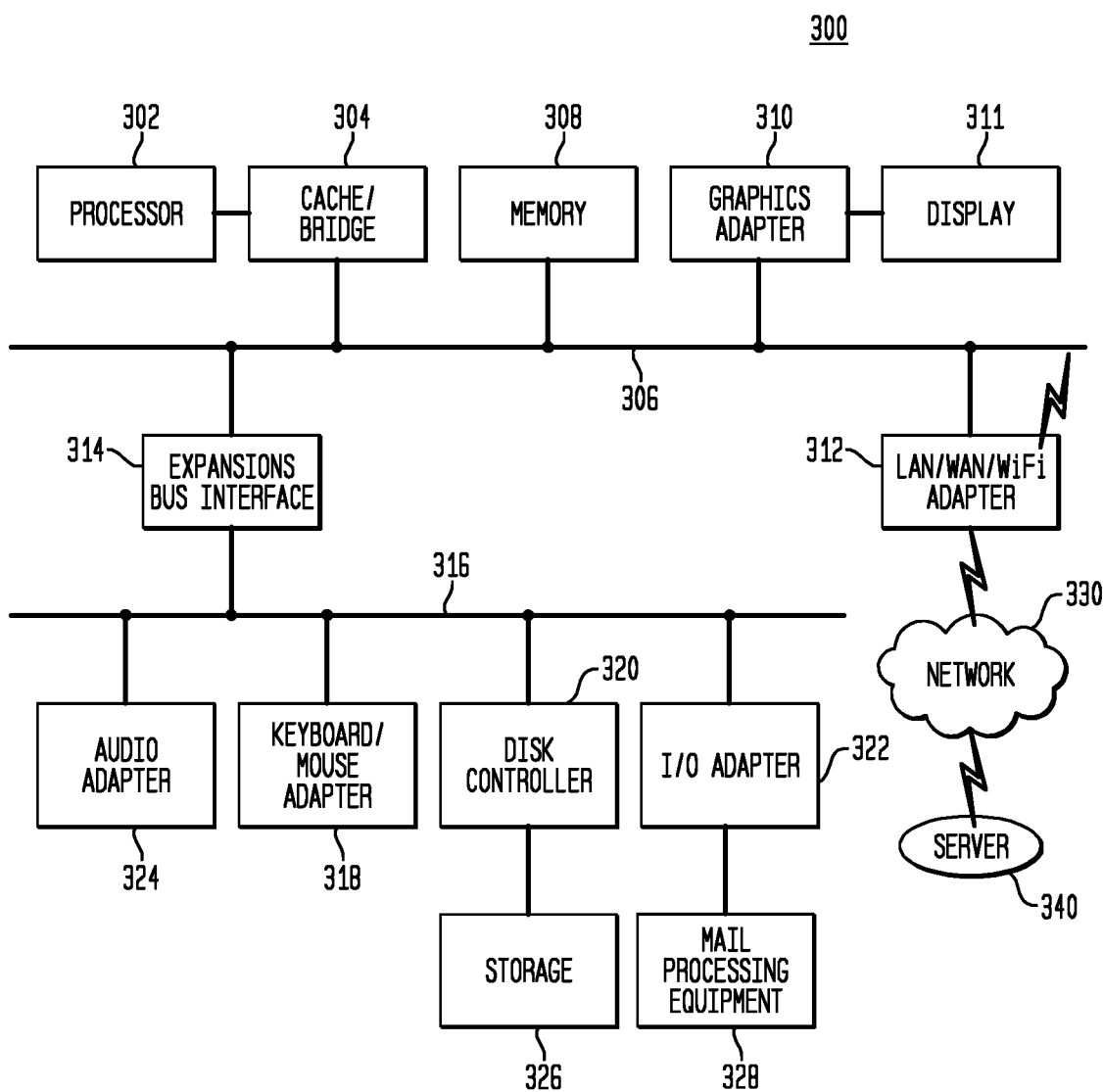
FIG. 3 depicts a block diagram of a data processing system with which an embodiment can be implemented.

FIG. 3 depicts a block diagram of a data processing system 300 with which an embodiment can be implemented, for example as a system for implementing any of the devices, methods, or systems described herein, and can be configured to perform processes as described herein, and in particular as data processing system 220. The data processing system depicted includes a processor 302 connected to a level two cache/bridge 304, which is connected in turn to a local system bus 306. Local system bus 306 may be, for example, a peripheral component interconnect (PCI) architecture bus. Also connected to local system bus in the depicted example are a main memory 308 and a graphics adapter 310. The graphics adapter 310 may be connected to display 311.

Other peripherals, such as local area network (LAN)/Wide Area Network (WAN)/Wireless (e.g. WiFi) adapter 312, may also be connected to local system bus 306. Expansion bus interface 314 connects local system bus 306 to input/output (I/O) bus 316. I/O bus 316 is connected to keyboard/mouse adapter 318, disk controller 320, and I/O adapter 322. Disk controller 320 can be connected to a storage 326, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 322 can be connected to mail processing equipment 328, which can include transport or imaging devices, cameras, or other hardware devices for processing mail in accordance with the various embodiments described herein. In particular, the mail processing equipment 320 can include the camera 114 as described above. In some cases, the camera 114 can be connected directly to I/O adapter 322 via USB connection; in other cases, camera 114 can be connected using a USB-to-Ethernet adapter to LAN/WAN/WiFi adapter 312. Mail processing equipment 328 can include printers for printing either directly on a mail piece or for printing labels to be applied to the mail pieces.

Also connected to I/O bus 316 in the example shown is audio adapter 324, to which speakers (not shown) may be connected for playing sounds. Keyboard/mouse adapter 318 provides a connection for a pointing device (not shown), such as a mouse, trackball, trackpointer, etc.

Those of ordinary skill in the art will appreciate that the hardware depicted in FIG. 3 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 312 can be connected to a network 330 (not a part of data processing system 300), which can be any public or private data processing system network or combination of networks, as known to those of skill in the art, including the Internet. LAN/WAN/Wireless adapter 312 can also communicate with packages as described herein, and perform other data processing system or server processes described herein. Data processing system 300 can communicate over network 330 with one or more server systems 340, which are also not part of data processing system 300, but can be implemented, for example, as separate data processing systems 300. A server system 340 can be, for example, any of the other systems described herein, and so indicates how systems can intercommunicate over network 330.

As described above, an apparatus and method as disclosed herein are particularly advantageous in processing non-automation UAA mail pieces. Such mail pieces are typically manually processed until they reach the delivery unit as indicated by the address label. Only at the delivery unit, in a typical process, does it become apparent that the mail piece is UAA, either because a failed delivery is attempted, or because a highly-skilled and knowledgeable employee notes that the address is non-existent, out-of-date, or otherwise invalid. In a typical process, the mail piece is then transported back to a regional processing center so that it can again be manually processed as a UAA mail piece, including performing any address corrections or marking it for forwarding or return to sender. In many cases, once the address is corrected, the mail piece is again transported to the same local delivery unit for delivery at the correct address.

Disclosed embodiments provide an improved workflow by using an apparatus 100 that can function in the local delivery unit to process the non-automation mail pieces quickly, efficiently, and locally. In a disclosed use case, as illustrated in FIG. 1, the local operator can stand at the apparatus 100 and place individual mail pieces (particularly in the case of parcels) or a stack of mail pieces (for example with letters or flats) on the table 102.

The apparatus 100, using camera 114 and data processing system 220, can detect the presence of the mail piece 222 on the table (or topmost mail piece in a stack of mail pieces 222). The apparatus can then take an image of the label on the mail piece 222, and store that image locally on the data processing system 220 and/or transmit it to a server system 340.

The data processing system can then automatically detect the physical characteristics of the mail piece, including its dimensions and weight (using a digital scale as described above). The data processing system can automatically detect the address block on the mail piece, and perform an optical character recognition (OCR) process on the address block to produce addressee information (that is, the name of the company or individual to whom the mail piece is addressed) and address information (the actual destination address on the mail piece). The data processing system can detect and read any barcode or other mail piece identifier on the mail piece. The data processing system can display, to the operator, the image, the addressee information, and/or the address information.

The image can be sent by the data processing system to a server 340, such as an image management system (IMS) (e.g., the United States Postal Service Image Management System). The IMS can check for an existing REJECT label for the mail piece and looks up any related image and resolution results. If there are no resolution results from previous processing, the IMS can process the new image. The resolution results and any other disposition instructions can be received from the IMS by the data processing system.

In point-of-sale applications, the data processing system can automatically determine postage for the mail piece based on the physical characteristics of the mail piece and the address information.

In UAA applications, the data processing system can use the addressee information and/or the address information to query one or more servers 340. Server 340 can be, for example, a national change-of-address database, a mail piece redirection server such as the United States Postal Service Postal Automated Redirection System (PARS). In response, the data processing system can receive, from the server, disposition instructions for the mail piece (such as discard, forward, reject, etc.), updated address information, or other information. The apparatus can then print any disposition instructions, updated address information, or other information either on the mail piece itself or on a label to be applied to the mail piece, for example by the operator.

In some cases, most or all of the processing described above can be performed locally by the data processing system. In other cases, certain processes can be offloaded to one or more of the servers 340.

The data processing system can an optical trigger task/process in conjunction with optical trigger marks on the surface of the table as described below. When processing a stack of mail pieces, for example, the mail pieces are oriented and processed via a vertical stack on the table 102. The operator can remove each mail piece from the top of the stack one at a time. The optical trigger task analyzes the image stream from the camera, detects the removal of the mail piece, identifies the triggered image, and notifies the data processing system to perform OCR on the selected image.

The ongoing camera feed is used by the data processing system for the optical trigger task. The triggering process for an image (for a right-hand operator in this example), includes determining whether top left- and right-side markers are visible, in which case no image will be triggered. If the top left marker is covered and the right-side marker is visible, then the optical trigger will notify the image for OCR process of the topmost mail piece in the stack. When the operator draws a mail piece out of the camera view over the right side marker, the marker is momentarily not visible, and so the optical trigger will notify the image for OCR process of the next mail piece of the stack. If the last mail piece on the stack is processed, then the optical trigger waits till the top left marker is covered again, starting the process over.

In some cases, for triggering image selection, after the trigger detects a blocked marker (top or side), the data processing system analyzes the difference between consecutive images. If the difference between previous image and current image is less than a defined value, then the current image will be selected for OCR processing, to prevent the capturing of un-sharp images.

Figure 4:
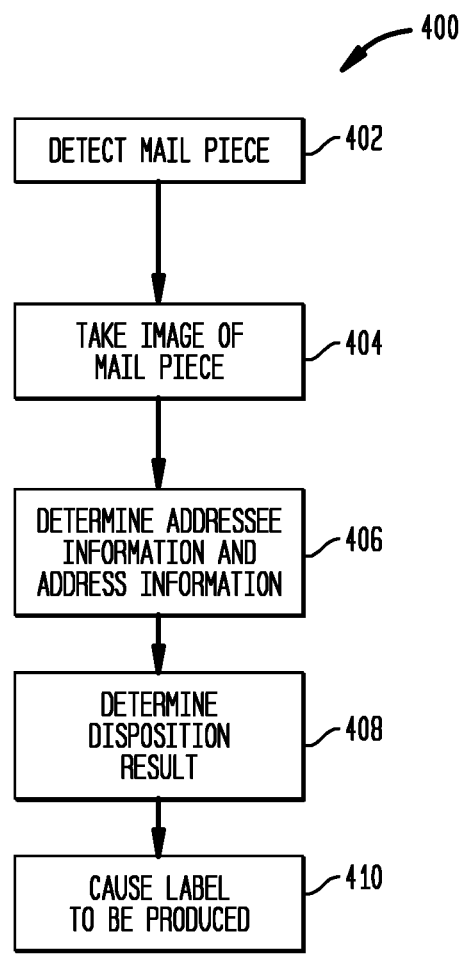
FIG. 4 illustrates a flowchart of a process in accordance with disclosed embodiments.

FIG. 4 illustrates a flowchart of a process 400 in accordance with disclosed embodiments, that can be performed by an apparatus 100 as disclosed herein, particularly under the control of the data processing system 220 and its processor 302, which is particularly configured to perform as disclosed herein.

The apparatus detects a mail piece to be processed on the table (402). The mail piece can be a letter, flat, or parcel, and can be a topmost mail piece in a stack of mail pieces. In particular cases, the mail piece is non-automation mail. In particular cases, the mail piece is UAA mail.

The apparatus takes an image of the mail piece (404). This is performed by the camera mounted over the table and can be performed automatically according to the trigger processes described herein.

The apparatus determines addressee information and address information for the mail piece based on the image (406). This can be performed in a number of different ways as disclosed herein. The apparatus can itself perform an OCR process to determine the addressee information and the address information. The apparatus can send the image to one or more server systems that perform the OCR process and return the addressee information and address information.

The apparatus determines a disposition result based on the image (408). The disposition result can be disposition instructions for the mail piece (such as discard, forward, reject, etc.), updated address information, a charge for shipping the mail piece to the addressee, or other information. Again, this can be performed in a number of different ways as disclosed herein. The apparatus can itself determine the disposition result from the image or its corresponding the addressee information and the address information. The apparatus can send the image, the addressee information, or the address information to one or more server systems that return the disposition result to the apparatus.

The apparatus causes a label to be produced, for application to the mail piece, according to the disposition result (410). This can include printing a label to be placed on the mail piece, printing or applying the label information directly on the mail piece, sending the disposition result to a separate printer, or otherwise. The label can include, for example, a corrected address for a UAA mail piece, a forwarding address according to a national COA database, indicia indicating that a shipping charge (including USPS postage) has been paid, tracking information, etc.

Figure 5:
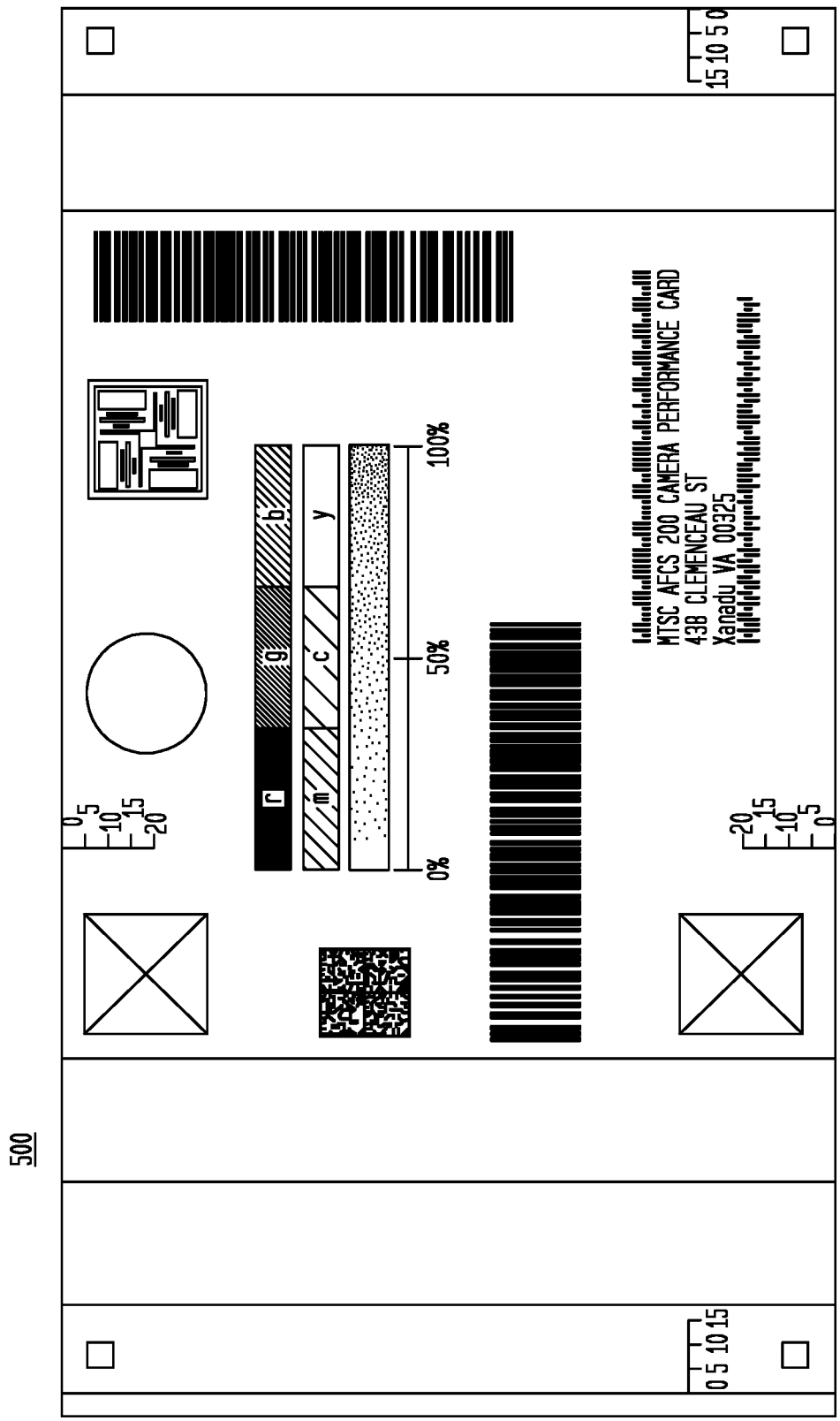
FIG. 5 illustrates an example of a test card in accordance with disclosed embodiments.

FIG. 5 illustrates an example of a test card 500 that can be used by data processing system 220 to calibrate the camera 114 in accordance with disclosed embodiments. To calibrate, such a test card 500 can be placed in the center of table 102, without overlaying any trigger marks, and can be placed in any orientation. Camera 114 and data processing system 220 can calibrate image brightness, contrast, focus, resolution, white value, and other factors.

Figure 6:
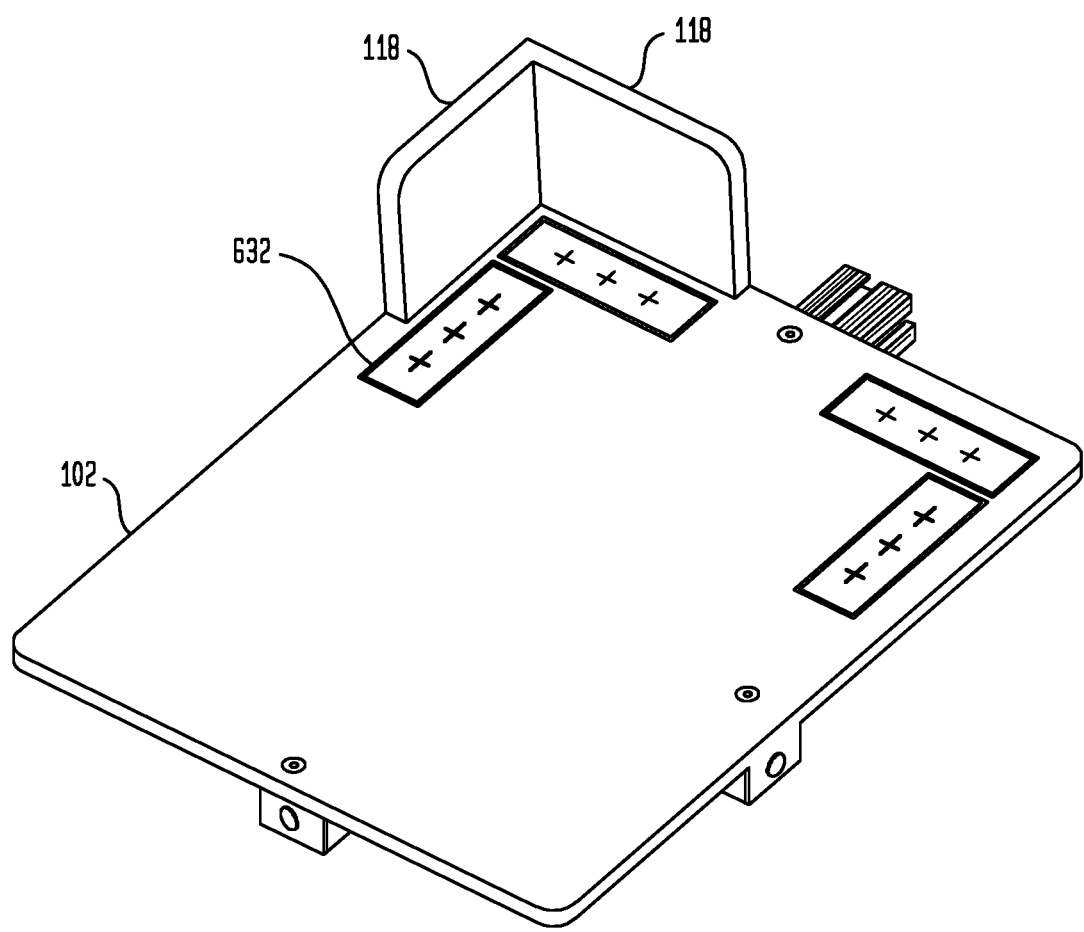
FIG. 6 illustrates an example of the surface of a table in accordance with disclosed embodiments.

FIG. 6 illustrates an example of the surface of table 102 in accordance with disclosed embodiments, including mail piece stops 118. On the surface of table 102, in some embodiments, are trigger marks 632. In various embodiments, there are two top trigger marks and two side trigger marks. For a right-handed operator, these can include a top left trigger mark and a right side trigger mark, while for a left-handed operator, these can included a top right trigger mark and a left side trigger mark.

Various embodiments can provide an adjustable field of view and image resolution. Various embodiments can provide a designed background pattern for the scanning system. Various embodiments can allow the camera to continuously scan the surface of the table with certain frame rate and provide a mechanism for automatic brightness regulation of the scanning system. Various embodiments can automatically select the best image of each item which is visible in the scanning zone for further processing.

Various embodiments can allow flexible feeding operations, such as cases where mail items can be fed individually and cases where mail items can be fed as a stack.

Various embodiments can provide methods to optimize the image quality, such as extracting mail items from the background and performing perspective correction.

Various embodiments do not require skilled maintenance or tools and can be operated and maintained by clerks not technicians.

Various embodiments can have a small footprint for small facilities and can sit beside standard sorting cases.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

U.S. patent application Ser. No. 15/414,146, filed Jan. 24, 2017, and Ser. No. 13/892,679, filed May 13, 2013, are incorporated by reference. United States Patents and Patent Publications U.S. Pat. No. 7,145,093, US 2004/0093222, US 2013/0044350, and US 2010/0102116 are also incorporated by reference.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A mail piece processing apparatus, comprising:
   a base;
   a table connected to the base by a vertical member;
   a camera mounted above the table and positioned to take an image of a mail piece on the table, wherein the table includes a plurality of trigger marks on a top surface of the table visible to the camera; and
   a data processing system, configured to:
      detect the presence of the mail piece according to the trigger marks and in response, to cause the camera to automatically take the image of the mail piece;
      receive the image of the mail piece from the camera;
      determine address information and address information of the mail piece according to the image;
      determine a disposition result for the mail piece according to the image; and
      cause a label to be printed for the mail piece according to the disposition result.

2. The mail piece processing apparatus of claim 1, further comprising wheels upon which the base is mounted.

3. The mail piece processing apparatus of claim 1, wherein a height of the table above the base is adjustable.

4. The mail piece processing apparatus of claim 1, wherein the table includes at least one mail piece stop along a side of the table.

5. The mail piece processing apparatus of claim 1, wherein the mail piece is a non-automation, undeliverable-as-addressed mail piece.

6. The mail piece processing apparatus of claim 1, wherein the table includes a digital scale connected to communicate with the data processing system.

7. The mail piece processing apparatus of claim 1, wherein the data processing system is further configured to send the image to an image management system server.

8. The mail piece processing apparatus of claim 1, wherein the data processing system is further configured to send the image to a server that performs an optical character recognition process on the image, and to receive the disposition result from the server.

9. The mail piece processing apparatus of claim 1, wherein the data processing system is further configured to send the addressee information and address information to a server, and to receive the disposition result from the server.

10. The mail piece processing apparatus of claim 1, wherein the data processing system is further configured to determine physical characteristics of the mail piece, and the disposition result includes a shipping charge for the mail piece.

11. The mail piece processing apparatus of claim 1, wherein the mail piece is a topmost mail piece in a stack of mail pieces on the table.

12. A method performed by a mail piece processing apparatus having a base, a table connected to the base by a vertical member, a camera mounted above the table and positioned to take an image of a mail piece on the table, wherein the table includes a plurality of trigger marks on a top surface of the table visible to the camera, and a data processing system, comprising:

detecting the presence of the mail piece according to the trigger marks and, in response, causing the camera to automatically take the image of the mail piece;

receiving the image of the mail piece from the camera;

determining address information and address information of the mail piece according to the image;

determining a disposition result for the mail piece according to the image; and causing a label to be printed for the mail piece according to the disposition result.

13. The method of claim 12, wherein the mail piece is a non-automation, undeliverable-as-addressed mail piece.

14. The method of claim 12, further comprising sending the image to an image management system server.

15. The method of claim 12, further comprising sending the image to a server that performs an optical character recognition process on the image, and receiving the disposition result from the server.

16. The method of claim 12, further comprising sending the addressee information and address information to a server, and receiving the disposition result from the server.

17. The method of claim 12, further comprising determining physical characteristics of the mail piece, and wherein the disposition result includes a shipping charge for the mail piece.

18. The method of claim 12, wherein the mail piece is a topmost mail piece in a stack of mail pieces on the table.

* * * * *